US012566801B2

(12) United States Patent (10) Patent No.: US 12,566,801 B2
Mannor et al. (45) Date of Patent: Mar. 3, 2026

(54) METHOD FOR FAST AND BETTER TREE SEARCH FOR REINFORCEMENT LEARNING

(71) Applicant: NVIDIA Corporation, Santa Clara, CA (US)

(72) Inventors: Shie Mannor, Haifa (IL); Assaf Joseph Hallak, Tel Aviv (IL); Gal Dalal, Haifa (IL); Steven Tarence Dalton, Cary, NC (US); Iuri Frosio, Bergamo (IT); Gal Chechik, Ramat Hasharon (IL)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/824,680

(22) Filed: May 25, 2022

(65) Prior Publication Data

US 2022/0398283 A1 Dec. 15, 2022

Related U.S. Application Data

(60) Provisional application No. 63/193,035, filed on May 25, 2021.

(51) Int. Cl.
G06F 16/903 (2019.01)
G06F 16/901 (2019.01)

(52) U.S. Cl.
CPC .... G06F 16/90335 (2019.01); G06F 16/9027 (2019.01)

(58) Field of Classification Search
CPC .......... G06F 16/90335; G06F 16/9027; G06N 3/044; G06N 3/0464; G06N 3/006; G06N 3/084; G06N 3/092; G06N 5/01
See application file for complete search history.

(56) References Cited

U.S. PATENT DOCUMENTS 8,429,097 B1 * 4/2013 Sivasubramanian ........................ G06F 16/2282
706/12
8,527,366 B2 * 9/2013 Jacob Sushil .......... G06Q 50/01
705/26.5

(Continued)

FOREIGN PATENT DOCUMENTS

CN 108429259 B * 10/2019 ........... G05B 19/042
CN 111062373 A * 4/2020
WO WO-2019149949 A1 * 8/2019 ............. G06N 3/045

OTHER PUBLICATIONS

Blair, J.M., et al., "Rational chebyshev approximations for the inverse of the error function," Mathematics of Computation, 30(136):827-830, 1976.

(Continued)

*Primary Examiner* — Sherief Badawi
(74) *Attorney, Agent, or Firm* — Leydig, Voit & Mayer, Ltd.

(57) ABSTRACT

A method for performing a Tree-Search (TS) on an environment is provided. The method comprises generating a tree for a current state of the environment based on a TS policy, determining a corrected TS policy, and determining an action to apply to the environment based on the corrected TS policy. The tree comprises a plurality of nodes including a root node among the plurality of nodes corresponding to the current state of the environment. Each node other than the root node among the plurality of nodes corresponding to an estimated future state of the environment. The plurality of nodes in the tree are connected by a plurality of edges. Each edge among the plurality of edges is associated with an action causing a transition from a first state to a different sate of the environment.

40 Claims, 10 Drawing Sheets

(56) References Cited

U.S. PATENT DOCUMENTS

| 2003/0135485 A1* | 7/2003 | Leslie | G06F 16/24545 |
| 2015/0062353 A1* | 3/2015 | Dalal | H04N 21/4394 |
| | | | 348/515 |
| 2018/0075105 A1* | 3/2018 | Chavan | G06F 16/221 |
| 2018/0253837 A1* | 9/2018 | Ghesu | G06T 7/0012 |
| 2018/0341989 A1* | 11/2018 | Reim | G06Q 30/0273 |
| 2020/0150672 A1* | 5/2020 | Naghshvar | G06V 10/00 |
| 2021/0097445 A1* | 4/2021 | Devlin | G06N 3/0495 |
| 2022/0318206 A1* | 10/2022 | Prahlad | G06F 16/1844 |

OTHER PUBLICATIONS

Brockman, G., et al., "OpenAI Gym," arXiv preprint arXiv:1606. 01540, 2016.
Browne, C.B., et al., "A survey of monte carlo tree search methods," IEEE Transactions on Computational Intelligence and AI in games, 4(1):1-43, 2012.
Buckman, J., et al., "Sample-efficient reinforcement learning with stochastic ensemble value expansion," arXiv preprint arXiv:1807. 01675, 2018.
Coulom, R. et al., "Efficient selectivity and backup operators in monte-carlo tree search," In International conference on computers and games, pp. 72-83, Springer 2006.
Dalton, S., et al., "Accelerating reinforcement learning through gpu atari emulation," arXiv preprint arXiv:1907.08467, 2019.
Efroni, Y., et al., "Beyond the one-step greedy approach in reinforcement learning," In International Conference on Machine Learning, pp. 1387-1396, PMLR, 2018.
Efroni, Y., et al., "How to combine tree-search methods in reinforcement learning," Proceedings of the AAAI Conference on Artificial Intelligence (AAAI 2019).
Farebrother, J., et al., "Generalization and Regularization in DQN," arXiv preprint arXiv:1810.00123, 2018.
Feinberg, V., et al., "Model-based value estimation for efficient model-free reinforcement learning," arXiv preprint arXiv:1803. 00101, 2018.
Ha, D., et al., "World Models," arXiv preprint arXiv:1803.10122, 2018.
Jessel, M., et al., "Rainbow: Combining improvements in deep reinforcement learning," In Proceedings of the AAAI Conference on Artificial Intelligence, vol. 32, 2018.
Jiang, D., et al., "Feedback-based tree search for reinforcement learning," In International conference on machine earning, pp. 2284-2293, PMLR, 2018.
Kaiser, L., et al., "Model-based reinforcement learning for atari," arXiv preprint arXiv:1903.00374, 2019.
Kalweit, G., et al., "Uncertainty-driven imagination for continuous deep reinforcement learning," In Conference on Robot Learning, pp. 195-206, PMLR, 2017.

Kim, S.W., et al., "Learning to simulate dynamic environments with gameGAN," In Proceedings of the IEEE/CVF Conference on Computer Vision and Pattern Recognition, pp. 1231-1240, 2020.
Krishnan, R., et al., "Deep kalman filters," arXiv preprint arXiv:1511. 05121, 2015.
Liang, J., et al., "GPU-accelerated robotic simulation for distributed reinforcement learning," In Conference on Robot earning, pp. 270-282, PMLR, 2018.
Mnih, V., et al., "Playing atari with deep reinforcement learning," arXiv preprint arXiv:1312.5602, 2013.
Moerland, T., et al., "Think too fast nor too slow: the computational trade-off between planning and reinforcement learning," arXiv preprint arXiv:2005.07404, 2020.
Munos, R., et al., "Safe and efficient off-policy reinforcement learning," Advances in Neural Information Processing Systems, vol. 29, Curran Associates, Inc., 2016.
Nagabandi, A., et al., "Neural network dynamics for model-based deep reinforcement learning with model-free fine tuning," In 2018 IEEE International Conference on Robotics and Automation (ICRA), pp. 7559-7566, IEEE, 2018.
Noreen, I., et al., "Optimal path planning using RRT* based approaches: a survey and future directions," Int.J.Adv. Comput.Sci. Appl., 7(11):97-101, 2016.
Oh, J., et al., "Action-conditional video prediction using deep networks in atari games," arXiv preprint arXiv:1507:08750, 2015.
Weber, T., et al., "Imagination-augmented agents for deep reinforcement learning," In Proceedings of the 31st International Conference on Neural Information Processing Systems, pp. 5694-5705, 2017.
Schrittwieser, J., et al., "Mastering atari, go, chess and shogi by planning with a learned model," Nature, 588 (7839):604-609, 2020.
Schrittwieser, J., et al., "Online and offline reinforcement learning by planning with a learned model," arXiv preprint arXiv:2104. 06294, 2021.
Silver, D., et al., "Mastering the game of go with deep neural networks and tree search," Nature, 529(7587):484-489, 2016.
Silver, D., et al., "Mastering chess and shogi by self-play with a general reinforcement learning algorithm," arXiv preprint arXiv:1712. 01815, 2017.
Todorov, E., et al., "Mujoco: a physics engine for model-based control," In 2012 IEEE/RSJ International Conference on Intelligent Robots and Systems, pp. 5026-5033, IEEE, 2012.
Williams, G., et al., "Information theoretic mpc for model-based reinforcement learning," In 2017 IEEE International Conference on Robotics and Automation (ICRA), pp. 1714-1721, IEEE, 2017.
Zanon, M., et al., "Safe reinforcement learning using robust MPC," IEEE Transactions on Automatic Control, 2020.
"How much did alphago zero cost?" https://www.yuzeh.com/data/ agz-cost.html; accessed:May 20, 2021.
Mokovlychuk, V., et al., "Isaac Gym: High Performance GPU-Based Physics Simulation For Robot Learning," arXiv:2108. 10470v2, Aug. 25, 2021.
Lavalle, S., et al., "Rapidly-Exploring Random Trees: A New Tool for Path Planning," Iowa State University, Ames, IA.

* cited by examiner

Determining a tree at a state of an environment.
210

Determining a correction term.
220

Determining an action based on a corrected TS policy.
230

Input Data
601

Data Assembly
610

Vertex Shading
620

Primitive Assembly
630

Geometry Shading
640

Viewport SCC
650

Rasterization
660

Fragment Shading
670

Raster Operations
680

Output Data
602

METHOD FOR FAST AND BETTER TREE SEARCH FOR REINFORCEMENT LEARNING

CROSS-REFERENCE TO RELATED APPLICATIONS

This application claims the benefit of U.S. Provisional Application No. 63/193,035 titled "TREE SEARCH FOR REINFORCEMENT LEARNING," filed May 25, 2021, the entire contents of which is incorporated herein by reference.

BACKGROUND

Tree search (TS) is a fundamental component of Reinforcement Learning (RL) used in some of the most successful RL systems. For instance, Monte-Carlo TS (MCTS) achieved superhuman performance in board games like Go, Chess, and Bridge. MCTS gradually unfolds the tree by adding nodes (e.g., leaves) and visitation counts online and storing them in memory for future traversals. This paradigm is suitable for discrete state-spaces where counts are aggregated across multiple iterations as the tree is built node-by-node, but less suitable for continuous state-spaces or image-based domains like robotics and autonomous driving. For the same reason, MCTS cannot be applied to improve pre-trained agents (e.g., a RL system) without collecting their visitation statistics in training iterations.

In addition, current techniques are limited due to other issues, such as distribution shift and scalability. A distribution shift may occur when applying a pre-trained policy to test in an environment. The larger variance of out-of-distribution states often translates to larger bias of the value maximized over those states, which leads to a distribution shift from the original pre-trained policy to the corresponding tree-based policy, thus causing the probability of falsely choosing a sub-optimal action being high. With respect to the scalability, the tree grows exponentially as the tree goes deeper. Accordingly, the TS process is computationally intensive, thus limiting the horizon of forward simulation steps.

As the foregoing illustrates, there is a need to develop a technology that improves the performance and efficiency of TS techniques.

SUMMARY

A method, system and computer-readable medium are disclosed herein to implement tree search for reinforcement learning in a fast and better manner.

In an exemplary embodiment, the present disclosure provides a method for performing a Tree-Search (TS) on an environment. The method comprises generating a tree for a current state of the environment, determining a corrected TS policy, and determining an action to apply to the environment based on the corrected TS policy. The tree comprises a plurality of nodes including a root node among the plurality of nodes corresponding to the current state of the environment. Each node other than the root node among the plurality of nodes corresponding to an estimated future state of the environment. The plurality of nodes in the tree are connected by a plurality of edges. Each edge among the plurality of edges is associated with an action causing a transition from a first state to a different sate of the environment.

In a further exemplary embodiment, determining the corrected TS comprises determining a difference between values computed for the root node and a node in an adjacent depth of the tree using a value function associated with the TS policy, and determining the corrected TS policy by combining the TS policy and the difference.

In a further exemplary embodiment, the tree is expanded to a final depth. Determining the action to apply to the environment based on the corrected TS policy comprises evaluating each node in the final depth of the tree using a corrected value function associated with the corrected TS policy, determining a node associated with a highest value computed using the corrected value function in the final depth of the tree, and determining the action for the state of the environment to be a first action in a trajectory of the tree including the node associated with the highest value in the final depth of the tree. The first action in the trajectory is associated with an edge between the root node and a node in an adjacent depth of the tree.

In a further exemplary embodiment, the tree is generated by expanding the tree using one or more parallel processing units (PPUs).

In a further exemplary embodiment, the one or more PPUs expand the tree by adding edges and nodes associated with a next depth of the tree in each iteration of the expansion.

In a further exemplary embodiment, the one or more PPUs process a number of state-action pairs in each iteration of the expansion. Each state-action pair includes an action and a state associated with a node of the tree at a depth prior to the depth to be added to the tree in the expansion.

In a further exemplary embodiment, the environment is associated with an action space comprising a plurality of actions.

In a further exemplary embodiment, the TS policy comprises a machine learning algorithm that is pre-trained in the environment.

In a further exemplary embodiment, the TS policy is based on Breadth-First-Search.

In a further exemplary embodiment, determining the corrected TS policy is based on one or more parameters related to the TS policy. The one or more parameters related to the TS policy comprise performance, counts, and internal errors of the TS policy in a training or inference process.

In another exemplary embodiment, the present disclosure provides an agent device for performing a Tree-Search (TS) on an environment. The agent device comprises a memory storing a TS policy, and one or more processors coupled to the memory. The one or more processors are configured to generate a tree for a current state of the environment based on a TS policy, determine a corrected TS policy, and determine an action to apply to the environment based on the corrected TS policy. The tree comprises a plurality of nodes including a root node among the plurality of nodes corresponding to the current state of the environment. Each node other than the root node among the plurality of nodes corresponding to an estimated future state of the environment. The plurality of nodes in the tree are connected by a plurality of edges. Each edge among the plurality of edges is associated with an action causing a transition from a first state to a different sate of the environment.

In a further exemplary embodiment, determining the corrected TS policy comprises determining a difference between values computed for the root node and a node in an adjacent depth of the tree using a value function associated with the TS policy, and determining the corrected TS policy by combining the TS policy and the difference.

In a further exemplary embodiment, the tree is expanded to a final depth. Determining the action to apply to the environment based on the corrected TS policy comprises evaluating each node in the final depth of the tree using a corrected value function associated with the corrected TS policy, determining a node associated with a highest value computed using the corrected value function in the final depth of the tree, and determining the action for the state of the environment to be a first action in a trajectory of the tree including the node associated with the highest value in the final depth of the tree. The first action in the trajectory is associated with an edge between the root node and a node in an adjacent depth of the tree.

In a further exemplary embodiment, the agent device further comprises one or more parallel processing units (PPUs). The tree is generated by expanding the tree using one or more PPUs.

In a further exemplary embodiment, the one or more PPUs expand the tree by adding edges and nodes associated with a next depth of the tree in each iteration of the expansion.

In a further exemplary embodiment, the one or more PPUs process a number of state-action pairs in each iteration of the expansion. Each state-action pair includes an action and a state associated with a node of the tree at a depth prior to the depth to be added to the tree in the expansion.

In a further exemplary embodiment, the environment is associated with an action space comprising a plurality of actions.

In a further exemplary embodiment, the TS policy comprises a reinforcement learning algorithm that is pre-trained in the environment.

In a further exemplary embodiment, agent device further comprises one or more sensors configured to measure the current state of the environment.

In a further exemplary embodiment, the one or more sensors comprises a camera.

In yet another exemplary embodiment, the present disclosure provides a non-transitory computer readable medium comprising instructions that, responsive to being executed by one or more processors, cause an agent device to perform a Tree-Search (TS) on an environment by generating a tree for a current state of the environment based on a TS policy, determining a corrected TS policy, and determining an action to apply to the environment based on the corrected TS policy. The tree comprises a plurality of nodes including a root node among the plurality of nodes corresponding to the current state of the environment. Each node other than the root node among the plurality of nodes corresponding to an estimated future state of the environment. The plurality of nodes in the tree are connected by a plurality of edges. Each edge among the plurality of edges is associated with an action causing a transition from a first state to a different sate of the environment.

BRIEF DESCRIPTION OF THE DRAWINGS

The present systems and methods for architecture-agnostic federated learning are described in detail below with reference to the attached drawing figures, wherein.

DETAILED DESCRIPTION

Systems and methods are disclosed related to Reinforcement Learning (RL) and/or other machine learning algorithms (e.g., evolutionary strategies, imitation learning, inverse reinforcement learning, or the like). An agent device may implement a corrected TS policy with a correction term integrated therein to improve the performance of the TS. The agent device may utilize the correction term to justify the estimation of the states in the tree, for example, by rewarding the better-known states (e.g., the states used by the current policy during the training) with a bonus or punishing the lesser-known states (e.g., imposing a bound to the off-policy states), such that the probability of the uncharted states (e.g., out-of-distribution states) being selected are significantly reduced. In this way, the agent device may avoid the deteriorations caused by a distribution shift from an original pre-trained policy to a corresponding tree-based policy, thus improving the TS performance. The systems and methods disclosed herein may be implemented in various machine learning tasks, such as autonomous driving, robotics, supply chain and operations management, etc., thereby achieving an improved performance.

In some embodiments, the agent device may compute the correction term based on a pre-trained RL system. Then the agent device may apply the correction term to the pre-trained TS policy associated with the pre-trained RL system without re-training the RL system or the TS policy. The correction term may be utilized in the training process or the inference process. In some embodiments, the correction term may be computed based on the Bellman error. In other embodiments, the correction term may be determined based on various other parameters, such as performance, counts, internal errors, etc., that are related to the TS policy.

In some embodiments, the agent device may implement a parallel processing unit (PPU) to execute the TS. For instance, a Batch-BFS (BFS stands for Breadth-First Search) algorithm may be utilized to perform the TS in a PPU-compatible fashion. The Batch-BFS may be a TS scheme based on Breadth-First Search. The Batch-BFS enables performing exhaustive tree expansion to previously infeasible depths, to address scalability issues and enable fast and efficient tree-searches.

Figure 1:
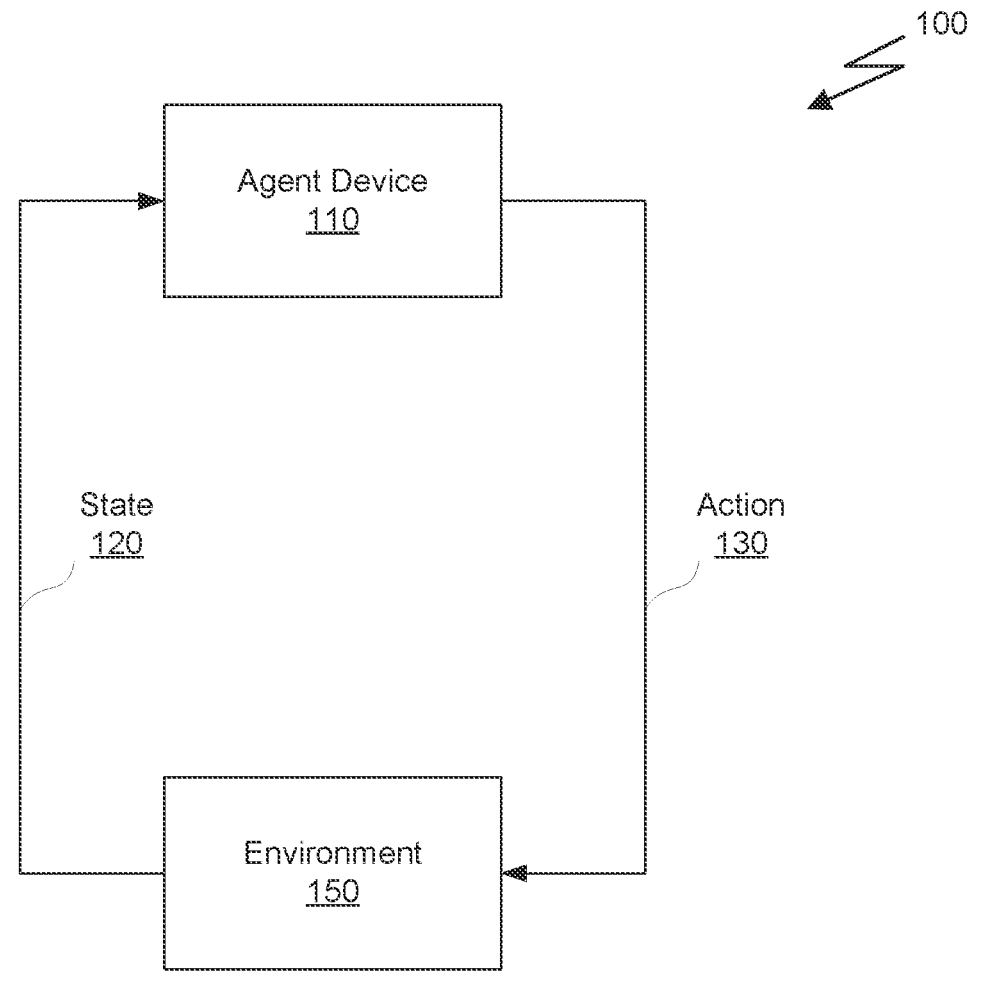
FIG. 1 illustrates a system including an agent device and an environment, in accordance with some embodiments.

FIG. 1 illustrates a system 100 including an agent device 110 and an environment 150, in accordance with some embodiments. The agent device 110 may be a terminal device, such as a personal computer or a smartphone, to process data obtained from the environment 150 and subsequently take actions with respect to the environment 150. The environment 150 may be a task or a simulation that the agent device 110 is configured to solve. In one instance, the environment 150 may be a video game (e.g., a chess game) running on a server or on the agent device 110. The agent device 110 may be configured to play the video game. In another instance, the environment 150 may be the natural world surrounding the agent device 110, such as a workplace. The agent device 110 (e.g., a robot, or an autonomous car) may be configured to plan a route to move in the workplace. In some variations, the agent device 110 may take inputs from the environment 150 through sensors and deliver the output to the environment 150 through actuators.

In some examples, the agent device 110 may implement an agent, which is an artificial intelligence (AI) algorithm, to interact with the environment 150. The environment 150 may comprise the physical surroundings of the agent device 110. The agent may be trained in the environment 150 or a similar environment by making decisions (e.g., to take actions) and receiving rewards (positive and negative) in the environment 150. In this way, a trained agent may be able to perceive and interpret the environment 150.

The environment 150 may be of various types. When the next state of the environment 150 at a given time is predictable, the environment is said to be a deterministic environment, else it is a Stochastic environment. When the environment 150 consists of a finite number of states and agents have a finite number of actions, the environment is said to be a discrete environment. While in a continuous environment, the environment 150 may have an infinite number of states, thus the possibilities of taking an action are also infinite. When an agent device 110 is capable to sense or access the complete state of the environment 150 at each point in time, the environment is said to be a fully observable environment, else the environment is partially observable. It should be noted that there may be other types of environments applicable to the techniques described in the present disclosure.

As shown in FIG. 1, the agent device 110 may obtain a state 120 of the environment 150 via an observation process. The state 120 can include a set of parameters that describe aspects of the environment 150. The environment 150 may have a discrete state-space, when the number of all possible states of the environment 150 is finite, in which each of the parameters may be selected from a set of discrete values. Alternatively, the environment 150 may have a continuous state-space, in which each of the parameters may be described by a corresponding continuous function. In a continuous state-space, the number of all possible states is infinite. The agent device 110 may include various hardware and software components to facilitate the observation process. For example, the agent device 110 may include sensors, such as cameras, to acquire images of the environment 150. The agent device 110 may implement a RL system to process the state 120 obtained in the observation 120 process so as to determine an action 130 to be applied to the environment 150. The RL system may include a TS policy to explore possible future states based on the observed state 120 of the environment 150 obtained via the observation process. The agent device 110 may determine an action 130 based on the results of the RL system and apply the action 130 to the environment 150. The agent device 110 may repeat the aforementioned observation process followed by one or more additional actions to interact with the environment 150. The processes described above may be utilized in a training phase as well as an inference phase.

In some embodiments, the agent device 110 may implement a trained RL system to interact with the environment 150 as shown in FIG. 1. The RL system may be trained in the environment 150 based on rewarding desired behaviors (e.g., actions) and/or punishing undesired ones, such that the trained RL system may be able to perceive and interpret the current and future states of environment 150. When the agent device 110 obtains a current state of the environment 150, the agent device may explore and traverse future states by using a TS algorithm. A tree may be a hierarchical pattern for data allocation, which may represent a collection of multiple nodes connected by edges. Various tree structures may be applied, such as binary tree, quadtree, octree, or general tree, in which each node can have undefined number of child nodes. When the tree may be used to represent an estimation of the environment 150 after one or more potential actions are taken in the environment 150, each node of the tree may represent a state of the environment 150. The tree may be expanded by adding nodes and edges to the tree. An expanded tree may include one root node and one or more child nodes. As an example, the tree may start with a root node to represent the current state of the environment 150. Potential actions that may be taken at the current state may be represented by edges having one end connected to the root node. Each of the edges connected to the root node may connect to a child node on the other end, which represents a future state transitioned from the root node caused by the action associated with the edge. Similarly, additional child nodes and edges may be added to the tree based on the child nodes and potential actions. In this way, the tree may be expanded to estimate the future states that potentially can occur in the environment 150. In some instances, the tree may be expanded in full (e.g., to cover a large number of sequential actions) to cover all possible states that can potentially happen in the environment 150 in response to taking different paths, each path corresponding to a sequence of actions in a particular order. The agent device 150 may perform the TS to traverse the expanded tree so as to determine a trajectory, which includes a sequence of actions, corresponding to a state that is closest to a target state (e.g., a final state with a highest probability). Then, the agent device 150 may determine one or more actions corresponding to the trajectory to be applied by the agent device 110.

In some examples, the agent device 110 may conduct a TS "on-demand" by expanding a tree down to a certain depth. For each node in a tree, the depth of the node is referred to as the number of edges back up to the root node. In some examples, the TS may be performed based on a Breadth-First search (BFS) algorithm, which starts at one node (e.g., the root node) and explore all nodes at the present depth level before moving on to the nodes at the next depth level. In some instances, the TS may be performed based on Depth-First search (DFS) algorithm, which also starts at one node (e.g., the root node) but explores as far (in depth) down the tree in accordance with a particular path as possible (e.g., to a leaf node) before backtracking. In some variations, the TS may be performed based on a combination of the BFS and DFS algorithms or other types of search algorithms.

When the agent device 110 conducts a TS based on a trained RL system. The TS is designed to attempt to "look" into the future, by estimating future states of the environment 150 in response to a series of actions. To this end, searching deeper in the tree should yield better results, for example, more likely to determine an action that leads to the best possible future state of the environment 150. However, in many cases, the opposite happens. For instance, when an agent device 110 tests a trained TS policy using a set of test data that is different from the set of training data, the agent device may obtain a testing distribution that differs from a training distribution. The testing/training distribution may be the distribution of the action-state value function (Q) associated with the trained TS policy. The difference between the training distribution and the testing distribution is referred to as the distribution shift. The training distribution indicates the probabilities of actions and states observed during the training process. The trained TS policy may select optimal actions that cause new states with the highest rewards. The actions and states that are rarely or never observed during the training process are not captured by the training distribution and referred to as out-of-distribution actions and states, respectively. Because the out-of-distribution actions and states are rarely observed during the training process, these out-of-distribution states tends to be inaccurately estimated. The large variance of the out-of-distribution states may translate to a large bias of the value maximized over those states. As a result, the value function error for the out-of-distribution states may be high, which may cause selection of a sub-optimal action with a falsely high value (e.g., probability) indicated by the value function. Such distribution shift may also be referred to as off-policy shift. As discussed above, the distribution shift may cause a deteriorated performance of the TS using a trained TS policy.

Embodiments of the present disclosure provide a simple, computationally effective off-policy correction term to address the above-discussed distribution shift so as to improve the TS performance. In some examples, the off-policy correction term may be determined based on the Bellman error. The TS that is implemented with an off-policy correction term based on the Bellman error may be referred to as the Bellman-Corrected Tree-Search (BCTS) algorithm in the present disclosure. BCTS yields monotonically increasing improvement as the tree depth increases.

Figure 2:
FIG. 2 illustrates a flowchart of a method for implementing a corrected TS algorithm, in accordance with some embodiments.
Figure 2:
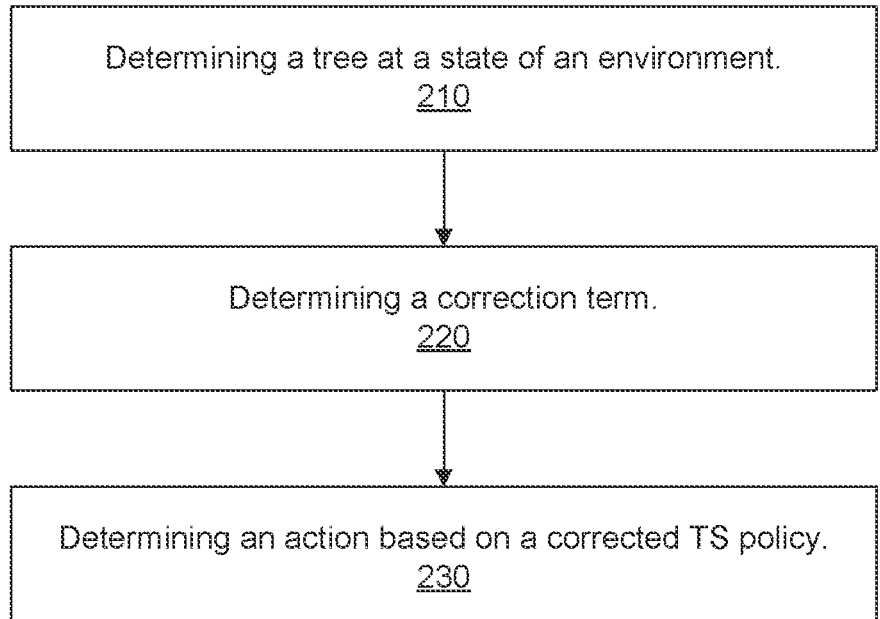

FIG. 2 illustrates a flowchart of a method for implementing a corrected TS algorithm, in accordance with some embodiments. An agent device 110 may implement a trained agent to interact with an environment 150. An agent is referred to as a RL system, which is trained to make decisions in an environment based on the rewards. The rewards may be computed via a trained TS policy.

At step 210, the agent device 110 determines a tree based on a state of the environment 150. In some embodiments, the agent device 110 may determine a current state 120 of the environment via an observation process as shown in FIG. 1A. The agent device 110 may perform a TS on demand by expanding the tree down to a certain depth. The current state may be represented by the root of the tree, which may be referred to as the top of the tree. The agent device 110 may implement a RL system (e.g., an agent) that is trained in the environment 150, such that the RL system has learned the possible states and the connections between the states in the environment. The tree may include a root node and one or more child nodes. The root node represents the current state, and the child nodes represent the possible states of the environment 150. The nodes in the tree are connected by lines, which are referred to as edges. An edge is associated with an action that leads to transition from one node at a present depth to another node at a next depth level. A TS policy of the RL system determines branching factors (e.g., rewarding/punishing branches/edges), which are associated with the probabilities of taking possible actions to cause corresponding new states. With that being said, the agent device 110 may expand the tree based on the trained RL system. The root node in the tree may be the current state observed in the environment 150. The tree may be expanded by first adding edges (i.e., actions) to each node in a present depth, then adding nodes associated with the edges in a next depth. In other words, the RL system may be trained to add child nodes to a current node, each child node connected by an edge representing a different action, and estimate the resulting new state for each child node based on the corresponding action. In this way, the RL system is trained to estimate future states of the environment based on a current state and a number of potential actions. Once the tree is expanded to reveal the possible future states to a target depth, the agent device 110 may traverse the edges and nodes in the tree to determine an optimized trajectory including a series of transitions from the current state towards a target state in the final depth of the expanded tree. The optimized trajectory may be associated with a target state with a highest accumulative reward score.

At step 220, the agent device 110 determines a correction term. The correction term may be determined based on a TS policy that is associated with a trained RL system. The agent device 110 may determine the correction term based on the tree unfolded in step 210.

The following describes an exemplary framework and demonstrates an exemplary process of determining a correction term. It should be noted that the framework and the process are described solely for illustration purposes and are not intended to limit the present disclosure.

The exemplary framework described hereinafter is an infinite-horizon discounted Markov Decision Process (MDP). An MDP is defined as a 5-tuple (S, A, P, r, γ), where S is a state space, A is a finite action space, P(s'|s, a) is a transition kernel, r(s, a) is a reward function, $\gamma \in (0, 1)$ is a discount factor. A state in the state space S is referred to as s, and an action in the action space A is referred to as a. At each step t=0, 1, . . . , the agent observes the last state $s_t$, performs an action $a_t$, and receives a reward $r_t$. The next step is then sampled by $s_{t+1} \sim P(\cdot|s_t, a_t)$.

A stationary policy is represented by Tr: S→A. The state-action value of a policy π is represented by $Q^\pi$: S'→ℝ. The state-action value in state s may be defined as $$Q^\pi(s, a) = E^\pi[\Sigma_{t=0}^\infty \gamma^t r(s_t, \pi(s_t, \pi(s_t)|s_0=s, a_0=a], \qquad \text{(Eq. 1)}$$

where $E^\pi$ denotes an expectation with regard to the distribution induced by the policy π. The goal for the TS is to find a policy π* that yields an optimal value Q* such that $$Q^*(s, a) = \max_\pi r(s, a) + \gamma E_{s' \sim P(\cdot|s,a)} \max_{a'} Q^\pi(s', a'). \qquad \text{(Eq. 2)}$$

Given $\pi^*(s) = \text{argmax}_a Q^*(s, a)$, Equation 2 may be written into, $$Q^*(s, a) = r(s, a) + \gamma E_{s' \sim P(\cdot|s,a)} \max_{a'} Q^\pi(s', a'). \qquad \text{(Eq. 3)}$$

In this exemplary framework, deterministic transitions are utilized to ease notations and understanding of the techniques in the present disclosure. For example, an action sequence may be defined as $(a_0, . . . , a_{d-1})$, where d refers to the number of steps executed in the TS. The action sequence starts at a state $s_0$, and leads to a corresponding trajectory $(s_0, . . . , s_d)$. It should be noted that the techniques in the present disclosure can be extended to a stochastic setup. To this end, the agent device may work with a marginal probability over the trajectory. Then, for a policy $\pi_o$, the d-step Q-function may be written as, $$Q_d^{\pi_o}(s, a) = \left[ \max_{\{a_k\}_{k=1}^d \in A} \left[ \sum_{t=0}^{d-1} \gamma^t r(s_t, a_t) \right] + \gamma^d Q^{\pi_o}(s_d, a_d) \right]_{s_0=s,a_0=a},$$ (Eq. 4)

where "o" denotes original. In some embodiments, a d-step Q-function estimator may be utilized. The d-step Q-function estimator may be denoted as $\hat{Q}_d^{\pi_o}(s, a)$, which uses an estimated Q-function $\hat{Q}_d^{\pi_o}$ instead of $Q^{\pi_o}$. The corresponding depth-d (that is at $d^{th}$ step) tree-policy may be denoted as $\pi_d$, which is expressed by $$\pi_d(s) := \operatorname{argmax}_{a \in A} \hat{Q}_d^{\pi_o}(s, a).$$ (Eq. 5)

The agent device 110 may determine a correction term that is applied to the estimated d-step Q-function $\hat{Q}_d^{\pi_o}$ to obtain a corrected d-step Q-function $\tilde{Q}_d^{\pi_o}$. As an example, the corrected d-step Q-function $\tilde{Q}_d^{\pi_o}$ may be written as, $$\tilde{Q}_d^{\pi_o}(s, a) := \begin{cases} \hat{Q}_d^{\pi_o}(s, a) & \text{if } a_0 = \pi_o(s_0), \\ \hat{Q}_d^{\pi_o}(s, a) - \gamma^d(\text{Bias}_e - \text{Bias}_o) & \text{else.} \end{cases}$$ (Eq. 6)

where "o" denotes original, "e" denotes else, $\text{Bias}_o$ is related to the difference between the expectations of $Q^{\pi_o}$ and the estimator $\hat{Q}_d^{\pi_o}$ for $a_0 = \pi_o(s_0)$, $\text{Bias}_e$ is related to the difference between the expectations of $Q^{\pi_o}$ and the estimator $\hat{Q}_d^{\pi_o}$ for $a_0 \neq \pi_o(s_0)$, and $\text{Bias}_o$ and $\text{Bias}_e$ satisfy $\text{Bias}_o < \text{Bias}_e$. As such, the expectation of $\tilde{Q}_d^{\pi_o}$ may satisfy the following, $$E[\tilde{Q}_d^{\pi_o}(s, \pi_o(s))] > E[\tilde{Q}_d^{\pi_o}(s, a)], \ a \neq \pi_o(s).$$ (Eq. 7)

Equation 7 holds if and only if $Q_d^{\pi_o}(s, \pi_o(s)) > Q_d^{\pi_o}(s, a \neq \pi_o(s))$. For $a_0 = \pi_o(s)$, there are $|a|^{d-1}$ Independent and Identically Distributed (IID) variables with distribution $N(\mu_o, \sigma_o^2)$. For $a_0 \neq \pi_o(s)$, there are $|A|^d - |A|^{d-1}$ IID variables with distribution $N(\mu_e, \sigma_e^2)$. A Generalized Extreme Value (GEV) theory may be utilized to describe a distribution of the maximal value among the tree leaves. In other words, the GEV-distribution describes the maximum among each of the above-discussed two sets of random variables. The GEV theory gives the following two distributions, $$G_o(s) \sim \text{GEV}(\mu_o^{GEV}(s), \sigma_o^{GEV}, 0), \ G_e(s) \sim \text{GEV}(\mu_e^{GEV}(s), \sigma_e^{GEV}, 0),$$ (Eq. 8)

where GEV is the Generalized Extreme Value distribution, $\mu_o^{GEV}(s)$ and $\mu_e^{GEV}(s)$ are corresponding mean values, and $\sigma_o^{GEV}$ and $\sigma_e^{GEV}$ are corresponding standard deviations. As a result, the policy $$\tilde{\pi}_d(s) = \max_a \tilde{Q}_d^{\pi_o}(s, a)$$

chooses a sub-optimal action with a probability bounded by, $$Pr\left( Q_d^{\pi_o}(s, \tilde{\pi}_d(s)) \neq \max_d Q_d^{\pi_o}(s, a) \right) \leq$$ (Eq. 9)

-continued $$\left( 1 + \frac{6(Q_d^{\pi_o}(s, \pi_o(s)) - Q_d^{\pi_o}(s, a \neq \pi_o(s))^2}{\gamma^{2d} \pi^2 ((\sigma_o^{GEV})^2 + (\sigma_e^{GEV})^2)} \right)^{-1}.$$

When the action space satisfies $A^{d-1} \gg 1$, Equation 9 can be approximated by, $$\text{Bias}_e - \text{Bias}_o \approx \sqrt{2 \log A} (\sigma_e \sqrt{d} - \sigma_o \sqrt{d-1}).$$ (Eq. 10)

where $\text{Bias}_o$ is related to $\sigma_o$, and $\text{Bias}_e$ is related to $\sigma_e$. Accordingly, Equation 9 can be written as, (Eq. 11)

$$Pr\left( Q_d^{\pi_o}(s, \tilde{\pi}_d(s)) \neq \max_d Q_d^{\pi_o}(s, a) \right) \leq$$

$$\left( 1 + \frac{12 \log A (Q_d^{\pi_o}(s, \pi_o(s)) - Q_d^{\pi_o}(s, a \neq \pi_o(s))^2}{\gamma^{2d} \pi^2 \left( \frac{\sigma_o^2}{d-1} + \frac{\sigma_e^2}{d} \right)} \right)^{-1}.$$

Since $\sigma_e > \sigma_o$, the penalty term in Equation 6, which is the correction term $\gamma^d(\text{Bias}_e - \text{Bias}_o)$, is always positive. This is indeed expected, as the positive bias due to maximization in the sub-tree of $a_0 = \pi_o(s)$ is smaller than the one in all other sub-trees. Also, Equation 8 or 11 indicates two trends as the tree goes deeper. First, the correction term $\gamma^d(\text{Bias}_e - \text{Bias}_o)$ in Equation 6 becomes smaller due to the $\gamma^d$ coefficient. Second, the error bounds in Equation 9 or 11 goes to zero. As such, the correction term applied to the trained TS policy may target the worst performance that is consistently observed for d=1 for the trained TS policy. Meanwhile, as the depth increases, the performance improvement due to the correction term becomes less significant.

The agent device 110 may estimate $\sigma_o$ and $\sigma_e$ so as to determine the correction term $\gamma^d(\text{Bias}_e - \text{Bias}_o)$ in Equation 6. In some embodiments, the agent device 110 may utilize the Bellman error to estimate the correction term. When the values of $\hat{Q}_d^{\pi_o}$ at different depths are treated as samples of $\hat{Q}^{\pi_o}$, the Bellman error can be calculated by, $$\hat{var}_{n=2}[\hat{Q}^{\pi_o}(s, a)] = \frac{(\hat{Q}_1^{\pi_o}(s, a) - \hat{Q}_0^{\pi_o}(s, a))^2}{4} = \frac{\delta^2(s, a)}{4},$$ (Eq. 12)

where $\delta(s, a)$ is the Bellman error. During a TS, at depth-1, the Bellman error $\delta(s_0, a)$ is available for all $a \in A$ without additional computation. For depth-2 and above, the Bellman error is defined only for actions chosen by $\pi_o$, which is corresponding to a single trajectory down the tree. For these reasons, Equation 12 may be applied to determine the estimation of the correction term in Equation 6 based on the samples from depths 0 and 1.

In some instances, the agent device 110 may determine a correction term based on other parameters related to the TS policy, such as a performance parameter, a count parameter, or an error parameter of the TS policy, etc. In some instances, the agent device 110 may learn these relevant parameters of the TS policy from a separate training/inference process. Based on the learnt parameters, the agent device 110 may determine a correction term to serve as additional positive/negative rewards so as to justify the estimation of the states in the tree. In some variations, the agent device 110 may modify a determined correction term based on the above-discussed parameters related to the TS policy.

At step 230, the agent device 110 determines an action based on a corrected TS policy. The corrected TS policy may be the trained TS policy incorporated with the correction term determined in step 220. For instance, the corrected TS policy may include a corrected d-step Q-function $\tilde{Q}_d^{\pi_o}$ as demonstrated by Equation 6. The agent device 110 may compute the Q-function estimation for all the states in depth-d of the unfolded tree by using the corrected Q-function estimator described by Equation 6. The agent device 110 may determine an optimal action for the root state based on the estimation results. As shown in Equation 6, the corrected Q-function estimator applies a bound to the off-policy states, which tend to be inaccurately estimated due to lack of observations of these off-policy states during the training process. The corrected Q-function estimator may justify the estimation of the off-policy states by implementing the correction term, such that the performance of the TS may be improved.

The agent device 110 may take the action determined in step 230 and observe the outcome of the environment 150. Then, the agent device 110 may repeat steps 210-230 based on the newly observed state of the environment 150 until reaching a terminal-state of the environment.

In some embodiments, the agent device 110 may implement a parallel adaptation so as to utilize one or more parallel processing units (PPUs) to perform one or more steps in process 200 as shown in FIG. 2. The agent device 110 may perform the TS in process 200 using a TS scheme based on BFS. BFS is an algorithm for searching a tree data structure for a node, in which the search starts at the root node of the tree and explores all the nodes at the present depth prior to moving on to the nodes at the next depth level. The one or more PPUs in the agent device 110 may be configured to process the states in the tree in batches. As such, the parallel adaptation may be referred to as Batch-BFS in the present disclosure.

Figure 3A:
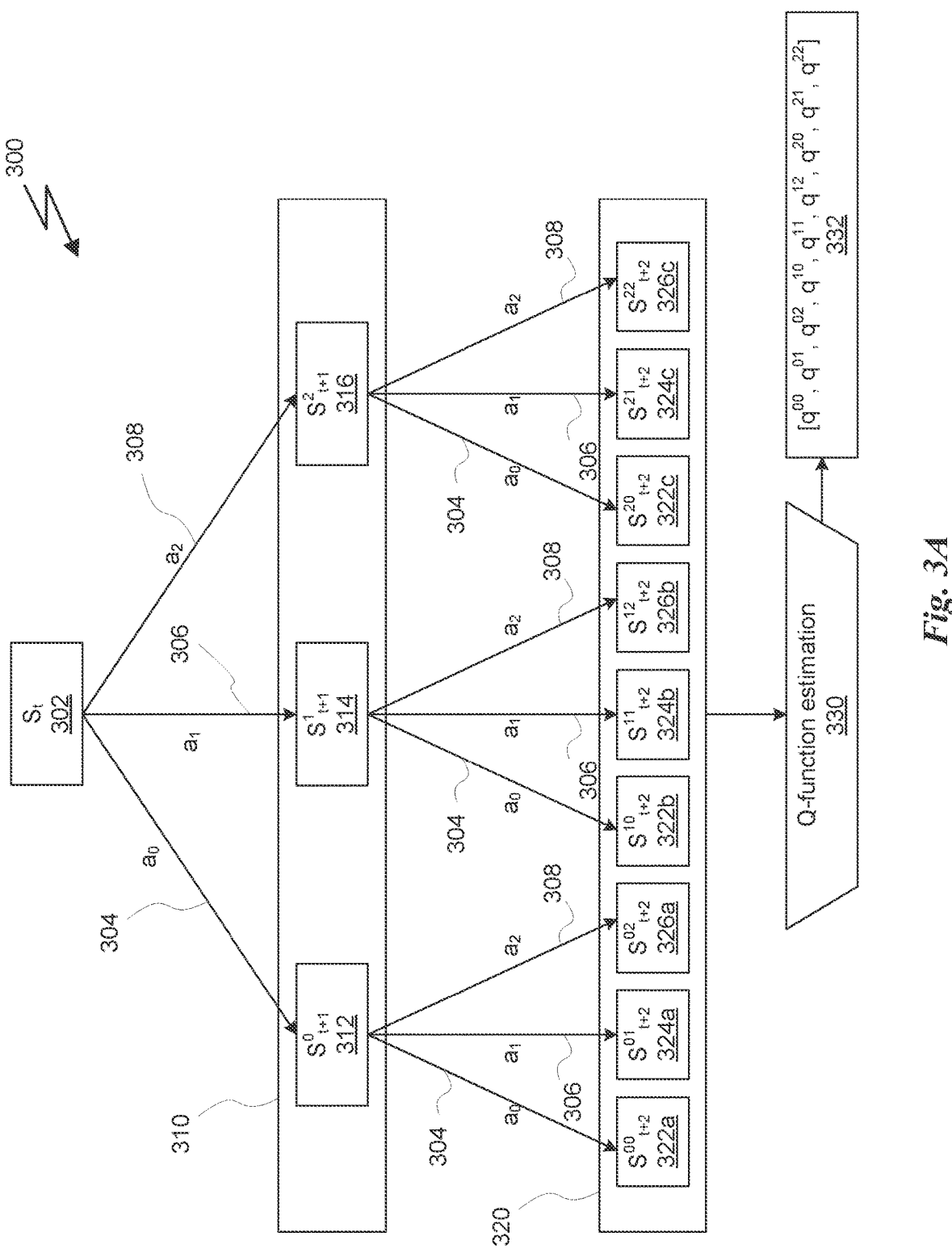
FIG. 3A illustrates a process for expanding a tree, in accordance with some embodiments.
Figure 3B:
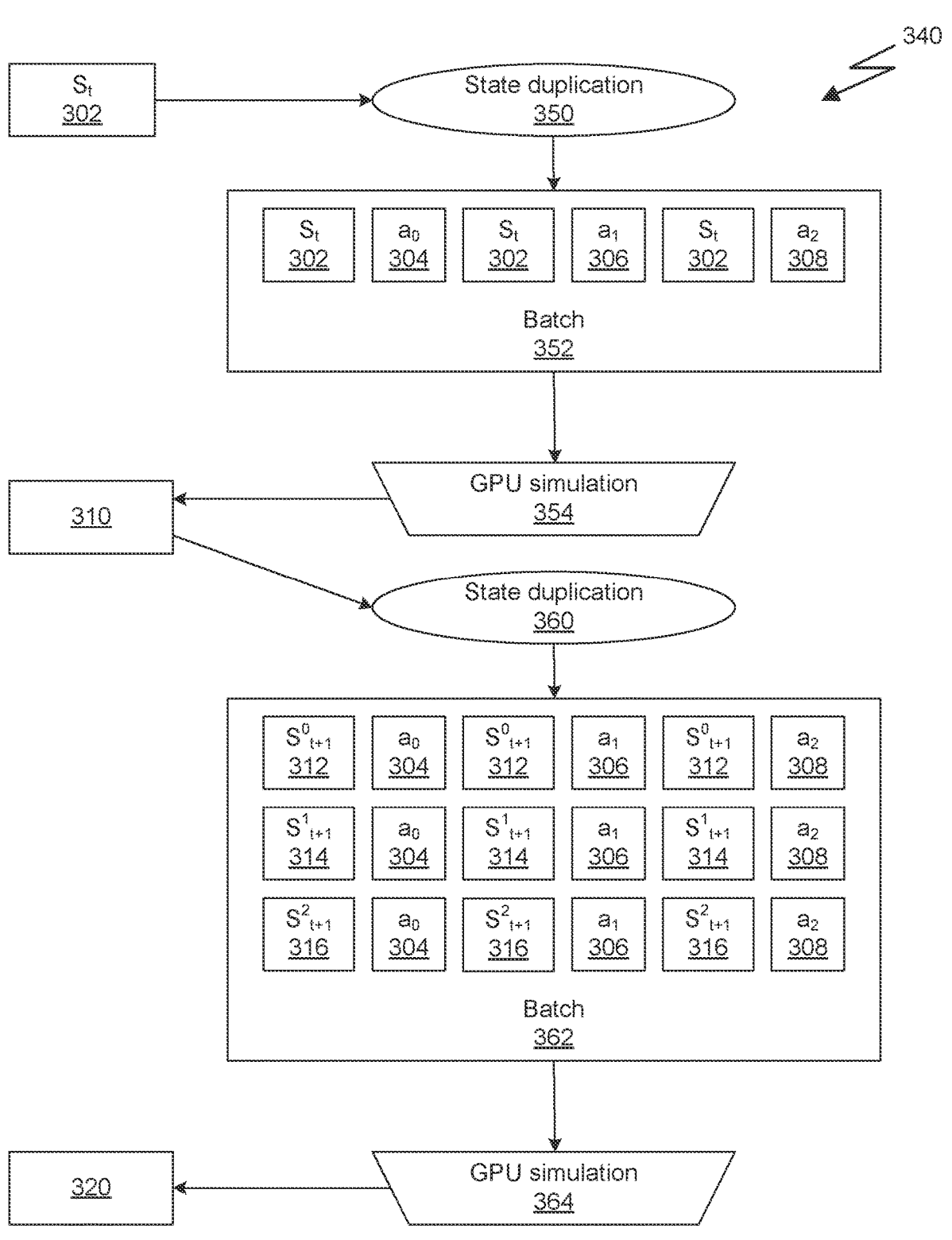
FIG. 3B illustrates an exemplary flowchart of a process for performing a TS utilizing a parallel processing unit, in accordance with some embodiments.

FIGS. 3A and 3B illustrate exemplary processes performed by an agent device 110, in accordance with some embodiments. Particularly, FIG. 3A illustrates a process for expanding a tree to depth-2 as an example. FIG. 3B illustrates a process for performing a tree search using parallelism as an example. The processes demonstrated in FIGS. 3A and 3B may be performed alone or in combination with the process 200.

As shown in FIG. 3A, in depth-0, the root of the tree represents a state $S_t$ denoted as 302. The state $S_t$ may be a current state observed in an environment by performing step 210 of the process 200 in FIG. 2. The action space A includes a finite number of actions, which are actions $a_0$, $a_1$, and $a_2$, denoted as branches 304, 306, and 308, respectively. The expansion process of the tree may be performed by the following steps. First, the agent device 110 may determine the possible actions in the action space that potentially can be applied to each of the available state(s) in a present depth. Then, the agent device 110 may generate nodes in a next depth, where the nodes represent estimated outcomes of the actions. The agent device 110 may implement a forward model to advance the tree expansion. In some examples, a forward model may include a deep neural network (DNN) with multiple layers. In every tree expansion, the forward model may take a state in a present depth and a potential action as inputs. Then, the forward model may generate a new state based on the given state and action. In some variations, an approximate simulation approach may be implemented to advance the tree expansion. As shown in FIG. 3A, block 310 includes possible states in depth-1 of the tree, which may be estimations of the new states transitioned from the state 302 possibly caused by actions 304, 306, and 308, respectively. The possible states in block 310 are $S_{t+1}^0$, $S_{t+1}^1$, and $S_{t+1}^2$, denoted as 312, 314, and 316. Similarly, the tree may be expanded to depth-2 by estimating the new states transitioned from the states 312, 314, and 316, caused by the actions 304, 306, and 308. As a result, block 320 includes possible states in depth-2 of the tree, which are $S_{t+2}^{00}$, $S_{t+2}^{01}$, $S_{t+2}^{02}$, $S_{t+2}^{10}$, $S_{t+2}^{11}$, $S_{t+2}^{12}$, $S_{t+2}^{20}$, $S_{t+2}^{21}$, and $S_{t+2}^{22}$, denoted as 322a, 324a, 326a, 322b, 324b, 326b, 322c, 324c, and 326c, respectively. In this way, the tree can be expanded to a pre-defined depth. To illustrate, the maximum depth of the tree as shown in FIG. 3A is two, although depths of 3 or greater are probable for some implementations of the techniques described herein. When the agent device 110 determines that the tree reaches the final depth, the agent device 110 may apply a Q-function estimator (e.g., expressed by Equation 6) per state in the final depth (e.g., depth-2) and obtain the estimated results $[q^{00}, q^{01}, q^{02}, q^{10}, q^{11}, q^{12}, q^{20}, q^{21}, q^{22}]$ associated with the states in the final depth as shown in block 322. Based on the results in block 322, the agent device may determine an optimized trajectory, representing a series of actions, corresponding to the tree root 302.

As shown in FIG. 3B, the expansion of the tree from the root to depth-1 may be performed by blocks 350, 352, and 354 in flowchart 340. In block 350, the agent device 110 may perform state duplication based on the root state $S_t$ 302 and the possible actions in the action space. For instance, the agent device may duplicate the root state 302 a number of times, such that each of the possible actions in the action space may be paired with a copy of the root state 302 to form a state-action pair. As a result, the agent device 110 may obtain a batch 352, which includes three state-action pairs associated with the three possible actions in the action space. In block 354, the agent device 110 may perform a simulation using a PPU to generate the nodes at depth-2 of the tree, which may result in the states in block 310 as shown in FIG. 3A. The simulation in block 354 may utilize a forward model, which may receive one or more state-action pairs as inputs and generate new states corresponding to the state-action pairs. The one or more state-action pairs are mutually independent, and therefore may be processed in parallel. As shown in FIG. 3A, the simulation may generate a set of states including the states 312, 314, and 316 in depth-1.

Similarly, the agent device 110 may compute the expansion of the tree from depth-1 to depth-2 by performing blocks 360, 362, and 364 in flowchart 340 as shown in FIG. 3B. The agent device 110 may perform state duplication for each of the states 312, 314, and 316 in depth-1. As a result, the agent device 110 may obtain a batch 362 including nine state-action pairs. In block 364, the agent device may perform a simulation, using the PPU, that is similar to block 354. Then the agent device may obtain three sets of states as shown in block 320 in FIG. 3A. The first set of states may include the states 322a, 324a, and 326a, which are estimated new states transitioned from the state 312. The second set of states may include the states 322b, 324b, and 326b, which are estimated new states transitioned from the state 314. The third set of states may include the states 322c, 324c, and 326c, which are estimated new states transitioned from the state 316.

The processes demonstrated in FIGS. 3A and/or 3B may be utilized to further expand a tree and determine an action corresponding to the root node (i.e., current state) based on the expanded tree.

Table 1 illustrates an exemplary algorithm being applied in a TS scheme based on BFS, in accordance with some embodiments. Table 1 includes exemplary codes to realize the TS disclosed in the present disclosure (e.g., the above-mentioned processes illustrated in FIGS. 1, 2, 3A and 3B).

TABLE 1

Batch-BFS policy

Input: A simulator, Q-function Q(s, a),s ∈ S, depth d
set state buffer = [s] and action buffer = [0, 1, 2, ..., |A| − 1];
for depth = 0 to d − 1 do
   Replicate state buffer s times A
   Advance the simulator applied on the state buffer and action buffer
   Replicate action buffer A times
end for
Apply Q on the state buffer per action and maximize v( state buffer) =

$\max_a$(Q(state buffer, a))

Return action which corresponds to depth = 0 of argmax v(state buffer)

As illustrated in Table 1, the tree is expanded down to depth-d. The simulator is utilized to process all the states in a present depth and generate the states in a next depth. Once reaching the final depth, such as depth-d, the simulator uses the Q-function estimator to perform estimation per state and determine a maximum value in the state buffer. In this way, the simulator may determine an optimal action corresponding to depth-0. The optimal action belongs to a trajectory associated with the maximum value in the state buffer.

The Batch-BFS described in the present disclosure provides for an efficient and parallel TS scheme, which supports exhaustive look-ahead for either PPU-implemented simulators or learned deep forward models. The Batch-BFS enables performing exhaustive tree expansion to previously infeasible depths. Since the Batch-BFS as described in the present disclosure simultaneously advances the entire tree, the cumulative reward and estimated values over all the nodes in each depth are therefore accessible by the agent device, thus enabling data-based adaptive depth as well as online validation and analysis of the tree process.

When using a TS policy, the action chosen by the agent device 110 does not choose an action by maximizing the current Q-function. Instead, the agent device 110 computes a cumulative discounted reward added with the Q-function of d steps forward in time, which goes over all possible actions at every step. To reach the Q value for every possible choice of d actions, the tree is expanded repeatedly for every possible action. This process is difficult to scale using existing technologies due to the requirement of generating $|A|^d$ number of nodes. The Batch-BFS policy as demonstrated in Table 1 may be implemented to go over all possible states and actions in the tree in a PPU-compatible fashion. The Batch-BFS builds upon the ability to simultaneously advance multiple environments associated with possible future states. Subsequently, each tree expansion can be done on the entire set of states in the previous expansion and for every action simultaneously, as shown in FIGS. 3A and 3B. In some embodiments, a forward model may not be available in the agent device 110. In this case, the agent device 110 may obtain a forward model that is learned and approximated through a network and ported to a PPU (e.g., the PPU in the agent device 110) later.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

For example, the agent device may incorporate one or more processors to perform the methods or implement the techniques discussed above. In an embodiment, at least a portion of the process may be implemented using a parallel processing unit such as PPU 400, described in more detail below.

Parallel Processing Architecture

Figure 4:
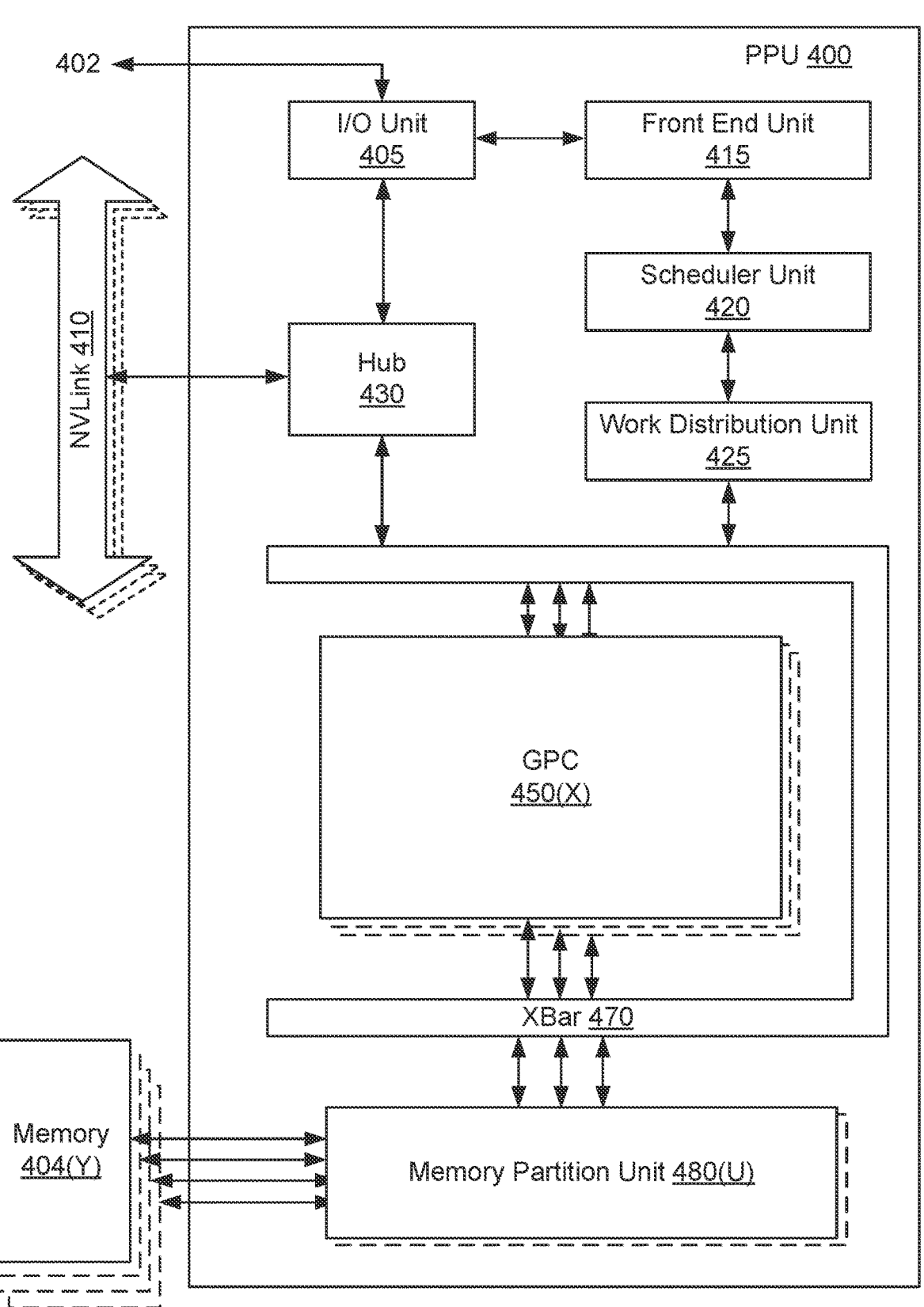
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement any portion of the methods 200, 210, or 220 set forth above. For example, the PPU 400 may be utilized by a ray-tracing algorithm to generate images for display. The ray-tracing algorithm may generate samples for calculating lighting values of a ray, where the samples are generated using one of the techniques set forth above.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units(TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
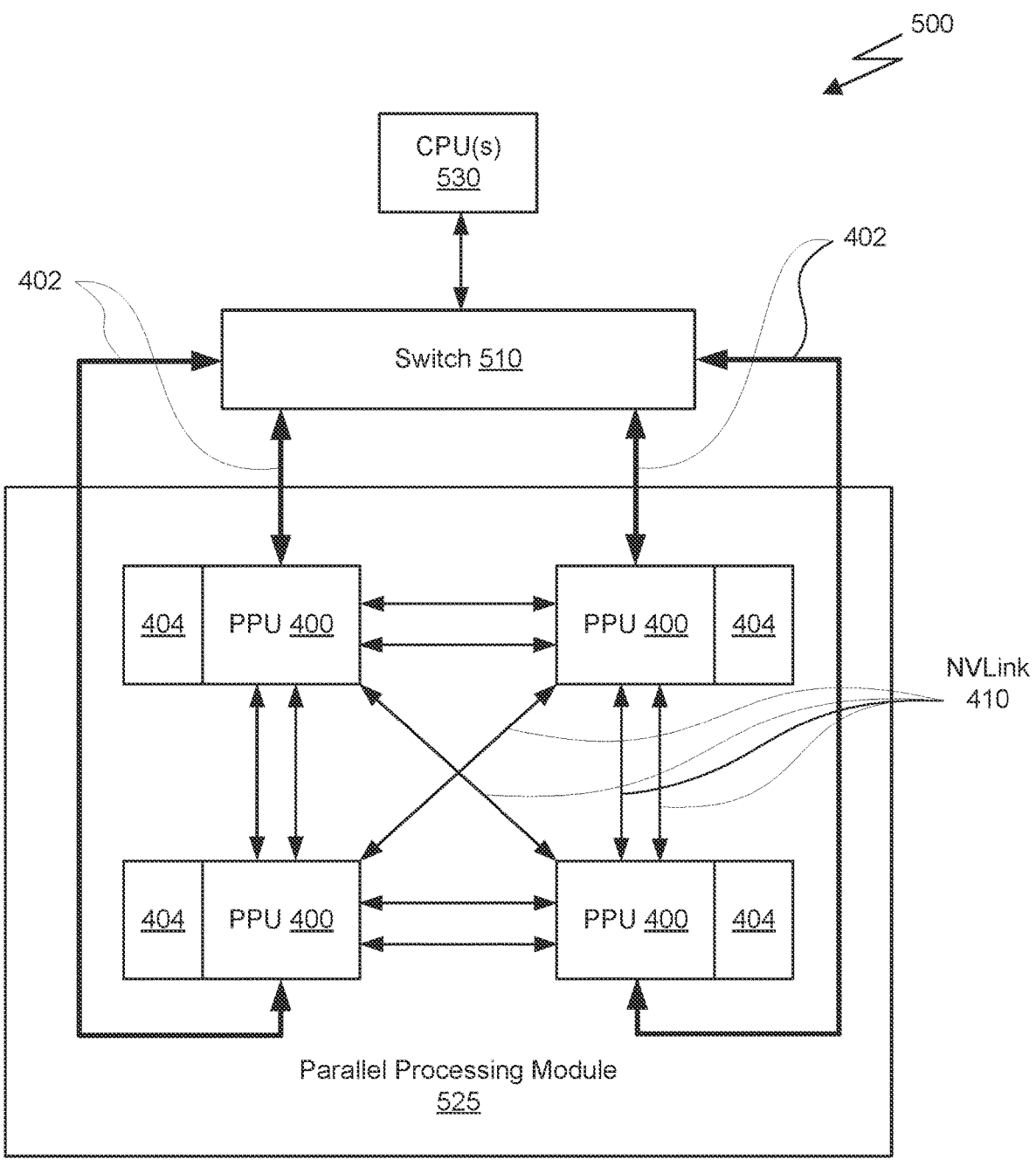
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method(s) shown in FIGS. 2A-2C. The processing system 500 includes a CPU 530, switch 510, and multiple PPUs 400, and respective memories 404.

Figure 5B:
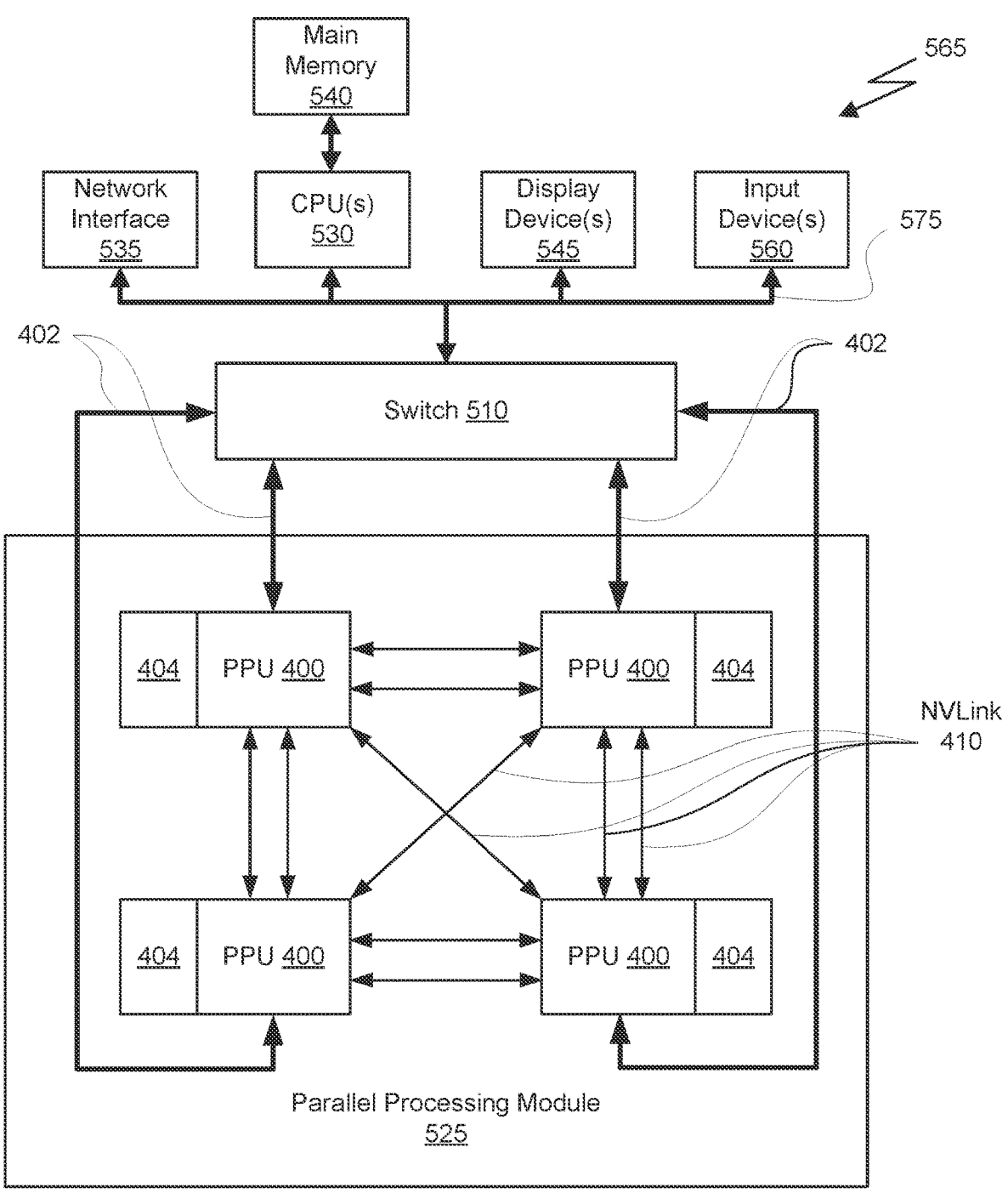
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method(s) shown in FIGS. 2A-2C.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
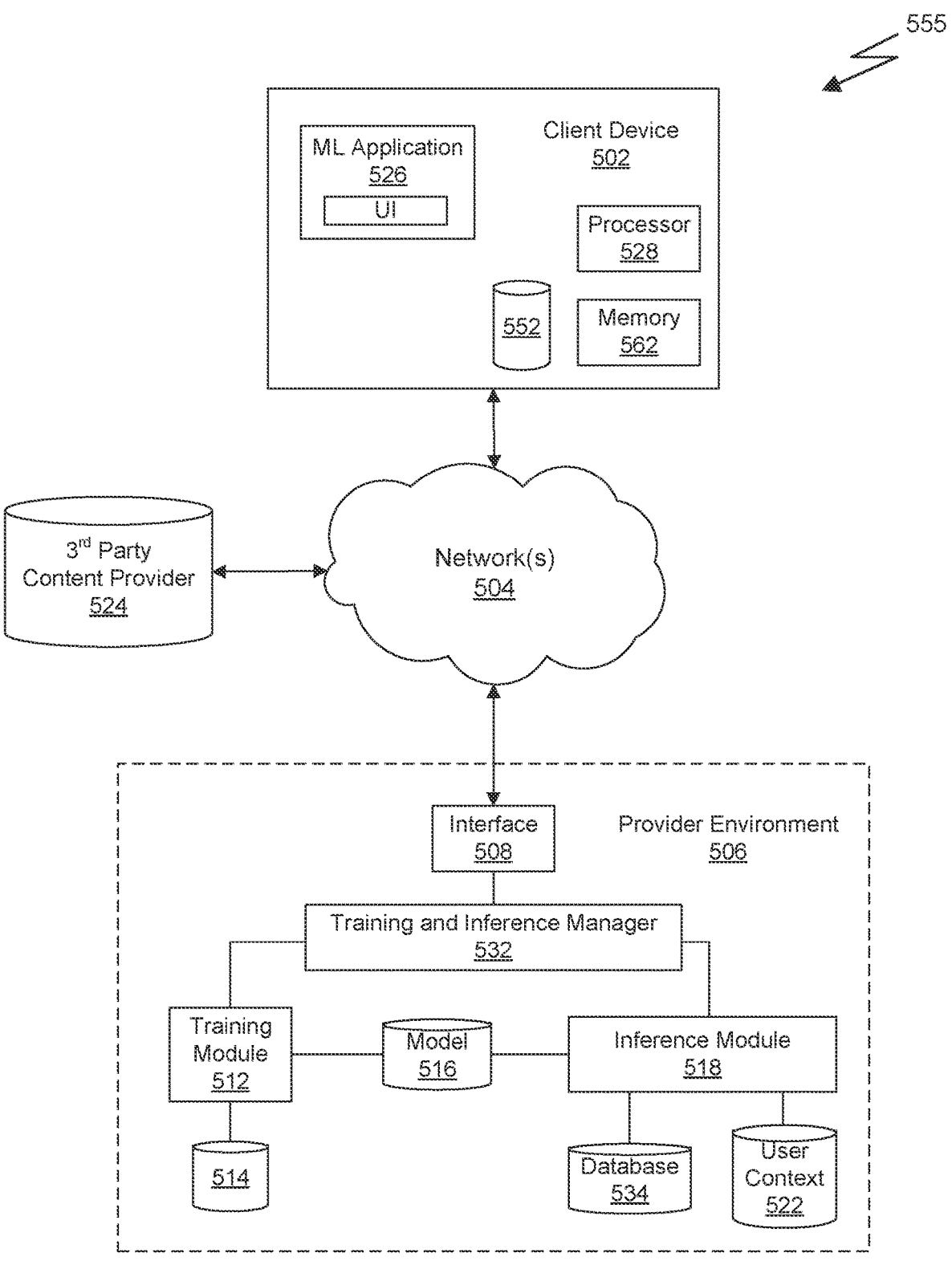
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for process-ing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes asso-ciated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be config-ured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing dif-ferent data from the same scene in a pipelined fashion until all of the model data for the scene has been rendered to the frame buffer. Then, the contents of the frame buffer are transmitted to a display controller for display on a display device.

Figure 6A:
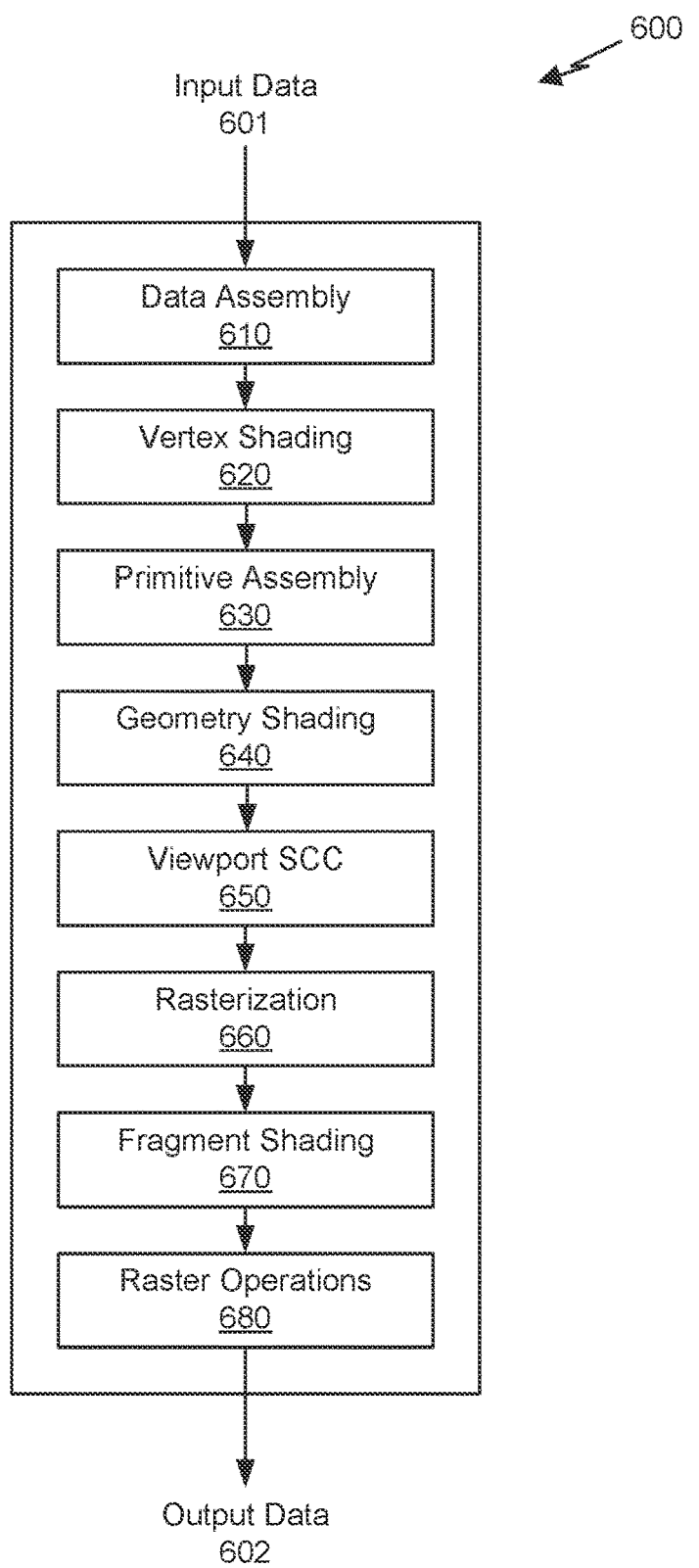
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graph-ics processing pipeline defined by the OpenGL® API. As an option, the graphics processing pipeline 600 may be imple-mented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a view-port scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shad-ing stage 620 may manipulate individual vertex attributes such as position, color, texture coordinates, and the like. In other words, the vertex shading stage 620 performs opera-tions on the vertex coordinates or other vertex attributes associated with a vertex. Such operations commonly includ-ing lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coor-dinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associ-ated vertices) to the geometry shading stage 640.

The geometry shading stage 640 processes geometric primitives by performing a set of operations (e.g., a geom-etry shader or program) on the geometric primitives. Tes-sellation operations may generate one or more geometric primitives from each geometric primitive. In other words, the geometry shading stage 640 may subdivide each geo-metric primitive into a finer mesh of two or more geometric primitives for processing by the rest of the graphics pro-cessing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
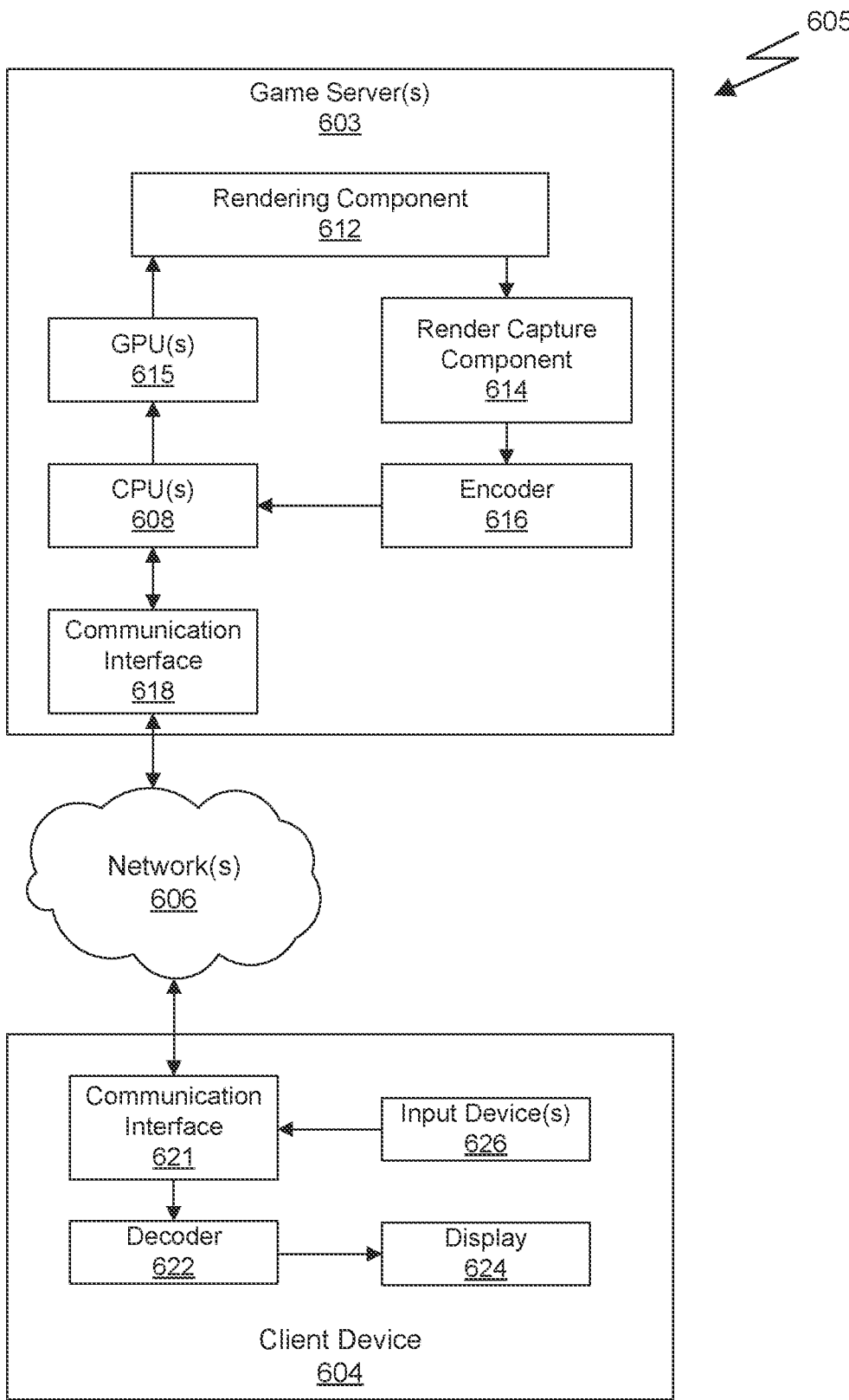
FIG. 6B illustrates an exemplary game streaming system suitable for use in implementing some embodiments of the present disclosure.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method, applied by an agent device on an environment, the method comprising:

generating, as a data structure in a processor-readable memory of the agent device, a tree for a current state of the environment based on a tree search (TS) policy, wherein the tree comprises a plurality of nodes including a root node among the plurality of nodes corresponding to the current state of the environment, each node other than the root node among the plurality of nodes corresponding to an estimated future state of the environment, the plurality of nodes in the tree are connected by a plurality of edges, and each edge among the plurality of edges is associated with an action causing a transition from a first state to a different state of the environment;

determining, by one or more processors of the agent device, a corrected TS policy by applying an off-policy correction term to an estimated value function associated with the TS policy to obtain a corrected estimated value function associated with the corrected TS policy, wherein the corrected estimated value function is configured to compensate for a distribution shift of the estimated value function associated with the TS policy by rewarding training states and/or applying a bound to off-policy states;

determining, by the one or more processors of the agent device based on the corrected TS policy, an action to apply to the environment; and applying, by the agent device, the action to the environment to transition to a new state.

2. The method of claim 1, wherein the determining the corrected TS policy comprises:

estimating, based on a calculated Bellman error, the correction term for each of a plurality of child nodes of the root node.

3. The method of claim 1, wherein the tree is expanded to a final depth, and wherein the determining, based on the corrected TS policy, the action to apply to the environment comprises:

evaluating, using the corrected estimated value function associated with the corrected TS policy, a value for each node in the final depth of the tree;

determining, for all nodes in the final depth of the tree, a node associated with a highest value computed using the corrected estimated value function; and determining the action for the state of the environment to be a first action in a trajectory of the tree including the node associated with the highest value in the final depth of the tree, wherein the first action in the trajectory is associated with an edge between the root node and a child node of the root node in an adjacent depth of the tree.

4. The method of claim 1, wherein the tree is generated by expanding the tree using one or more parallel processing units (PPUs).

5. The method of claim 4, wherein the one or more PPUs expand the tree by adding edges and nodes associated with a next depth of the tree in each iteration of the expansion.

6. The method of claim 5, wherein the one or more PPUs process a number of state-action pairs in each iteration of the expansion, and wherein each state-action pair includes an action and a state associated with a node of the tree at a depth prior to the depth to be added to the tree in the expansion.

7. The method of claim 6, wherein the environment is associated with an action space comprising a plurality of actions.

8. The method of claim 1, wherein the TS policy comprises a machine learning algorithm that is pre-trained in the environment.

9. The method of claim 1, wherein the TS policy is based on Breadth-First-Search.

10. The method of claim 1, wherein the determining the corrected TS policy is based on one or more parameters related to the TS policy, and wherein the one or more parameters related to the TS policy comprise at least one of a performance parameter, a count parameter, or an error parameter of the TS policy.

11. The method according to claim 1, wherein the applying, by the agent device, the action to the environment to transition to a new state comprises executing a movement, by a robot or an autonomous vehicle, in the environment.

12. An agent device for performing a Tree-Search (TS) on an environment, the agent device comprising:

a processor-readable memory storing a TS policy; and one or more processors coupled to the memory and configured to:

generate, as a data structure in the processor-readable memory of the agent device, a tree for a current state of the environment based on the TS policy, wherein the tree comprises a plurality of nodes including a root node among the plurality of nodes corresponding to the current state of the environment, each node other than the root node among the plurality of nodes corresponding to an estimated future state of the environment, the plurality of nodes in the tree are connected by a plurality of edges, and each edge among the plurality of edges is associated with an action causing a transition from a first state to a different state of the environment, determine a corrected TS policy by applying an off-policy correction term to an estimated value function associated with the TS policy to obtain a corrected estimated value function, wherein the corrected estimated value function is configured to compensate for a distribution shift of the estimated value function associated with the TS policy by rewarding training states and/or applying a bound to off-policy states, determine, based on the corrected TS policy, an action to apply to the environment, and apply, by the agent device, the action to the environment to transition to a new state.

13. The agent device of claim 12, wherein the determining the corrected TS policy comprises:

estimating, based on a calculated Bellman error, the correction term for each of a plurality of child nodes of the root node.

14. The agent device of claim 12, wherein the tree is expanded to a final depth, and wherein the determining, based on the corrected TS policy, the action to apply to the environment comprises:

evaluating, using the corrected estimated value function associated with the corrected TS policy, a value for each node in the final depth of the tree;

determining, for all nodes in the final depth of the tree, a node associated with a highest value computed using the corrected estimated value function; and determining the action for the state of the environment to be a first action in a trajectory of the tree including the node associated with the highest value in the final depth of the tree, wherein the first action in the trajectory is associated with an edge between the root node and a child node of the root node in an adjacent depth of the tree.

15. The agent device of claim 12, further comprising one or more parallel processing units (PPUs), and wherein the tree is generated by expanding the tree using the one or more PPUs.

16. The agent device of claim 15, wherein the one or more PPUs expand the tree by adding edges and nodes associated with a next depth of the tree in each iteration of the expansion.

17. The agent device of claim 16, wherein the one or more PPUs process a number of state-action pairs in each iteration of the expansion, and wherein each state-action pair includes an action and a state associated with a node of the tree at a depth prior to the depth to be added to the tree in the expansion.

18. The agent device of claim 17, wherein the environment is associated with an action space comprising a plurality of actions.

19. The agent device of claim 12, wherein the TS policy comprises a reinforcement learning algorithm that is pre-trained in the environment.

20. The agent device of claim 12, further comprising one or more sensors configured to measure the current state of the environment.

21. The agent device of claim 20, wherein the one or more sensors comprise a camera.

22. A non-transitory computer readable medium comprising instructions that, responsive to being executed by one or more processors, cause an agent device to perform a Tree-Search (TS) on an environment by:

generating, as a data structure in a processor-readable memory of the agent device, a tree for a current state of the environment based on a TS policy, wherein the tree comprises a plurality of nodes including a root node among the plurality of nodes corresponding to the current state of the environment, each node other than the root node among the plurality of nodes corresponding to an estimated future state of the environment, the plurality of nodes in the tree are connected by the edges, and each edge among the plurality of edges is associated with an action causing a transition from a first state to a different state of the environment;

determining, by the one or more processors, a corrected TS policy by applying an off-policy correction term to an estimated value function associated with the TS policy to obtain a corrected estimated value function associated with the corrected TS policy, wherein the corrected estimated value function is configured to compensate for a distribution shift of the estimated value function associated with the TS policy by rewarding training states and/or applying a bound to off-policy states;

determining, by the one or more processors based on the corrected TS policy, an action to apply to the environment; and applying, by the agent device, the action to the environment to transition to a new state.

23. A method, applied by an agent device on an environment, the method comprising:

generating, as a data structure in a processor-readable memory of the agent device, a tree for a current state of the environment based on a tree search (TS) policy, wherein the tree comprises a plurality of nodes including a root node among the plurality of nodes corresponding to the current state of the environment, each node other than the root node among the plurality of nodes corresponding to an estimated future state of the environment, the plurality of nodes in the tree are connected by a plurality of edges, and each edge among the plurality of edges is associated with an action causing a transition from a first state to a different state of the environment;

determining, by one or more processors of the agent device, a corrected TS policy by applying a correction term to an estimated value function associated with the TS policy to obtain a corrected estimated value function associated with the corrected TS policy;

determining, by the one or more processors of the agent device based on the corrected TS policy, an action to apply to the environment; and applying, by the agent device, the action to the environment to transition to a new state, wherein the determining the corrected TS policy comprises estimating, based on a calculated Bellman error, the correction term for each of a plurality of child nodes of the root node.

24. The method of claim 23, wherein the tree is expanded to a final depth, and wherein the determining, based on the corrected TS policy, the action to apply to the environment comprises:

evaluating, using the corrected estimated value function associated with the corrected TS policy, a value for each node in the final depth of the tree;

determining, for all nodes in the final depth of the tree, a node associated with a highest value computed using the corrected estimated value function; and determining the action for the state of the environment to be a first action in a trajectory of the tree including the node associated with the highest value in the final depth of the tree, wherein the first action in the trajectory is associated with an edge between the root node and a child node of the root node in an adjacent depth of the tree.

25. The method of claim 23, wherein the tree is generated by expanding the tree using one or more parallel processing units (PPUs).

26. The method of claim 25, wherein the one or more PPUs expand the tree by adding edges and nodes associated with a next depth of the tree in each iteration of the expansion.

27. The method of claim 26, wherein the one or more PPUs process a number of state-action pairs in each iteration of the expansion, and wherein each state-action pair includes an action and a state associated with a node of the tree at a depth prior to the depth to be added to the tree in the expansion.

28. The method of claim 27, wherein the environment is associated with an action space comprising a plurality of actions.

29. The method of claim 23, wherein the TS policy comprises a machine learning algorithm that is pre-trained in the environment.

30. The method of claim 23, wherein the TS policy is based on Breadth-First-Search.

31. The method of claim 23, wherein the determining the corrected TS policy is based on one or more parameters related to the TS policy, and wherein the one or more parameters related to the TS policy comprise at least one of a performance parameter, a count parameter, or an error parameter of the TS policy.

32. An agent device for performing a Tree-Search (TS) on an environment, the agent device comprising:

a processor-readable memory storing a TS policy; and one or more processors coupled to the memory and configured to:

generate, as a data structure in the processor-readable memory of the agent device, a tree for a current state of the environment based on the TS policy, wherein the tree comprises a plurality of nodes including a root node among the plurality of nodes corresponding to the current state of the environment, each node other than the root node among the plurality of nodes corresponding to an estimated future state of the environment, the plurality of nodes in the tree are connected by a plurality of edges, and each edge among the plurality of edges is associated with an action causing a transition from a first state to a different state of the environment, p1 determine a corrected TS policy by applying a correction term to an estimated value function associated with the TS policy to obtain a corrected estimated value function, determine, based on the corrected TS policy, an action to apply to the environment, and apply, by the agent device, the action to the environment to transition to a new state, wherein the determining the corrected TS policy comprises estimating, based on a calculated Bellman error, the correction term for each of a plurality of child nodes of the root node.

33. The agent device of claim 32, wherein the tree is expanded to a final depth, and wherein the determining, based on the corrected TS policy, the action to apply to the environment comprises:

evaluating, using the corrected estimated value function associated with the corrected TS policy, a value for each node in the final depth of the tree;

determining, for all nodes in the final depth of the tree, a node associated with a highest value computed using the corrected estimated value function; and determining the action for the state of the environment to be a first action in a trajectory of the tree including the node associated with the highest value in the final depth of the tree, wherein the first action in the trajectory is associated with an edge between the root node and a child node of the root node in an adjacent depth of the tree.

34. The agent device of claim 32, further comprising one or more parallel processing units (PPUs), and wherein the tree is generated by expanding the tree using the one or more PPUs.

35. The agent device of claim 34, wherein the one or more PPUs expand the tree by adding edges and nodes associated with a next depth of the tree in each iteration of the expansion.

36. The agent device of claim 35, wherein the one or more PPUs process a number of state-action pairs in each iteration of the expansion, and wherein each state-action pair includes an action and a state associated with a node of the tree at a depth prior to the depth to be added to the tree in the expansion.

37. The agent device of claim 36, wherein the environment is associated with an action space comprising a plurality of actions.

38. The agent device of claim 32, wherein the TS policy comprises a reinforcement learning algorithm that is pre-trained in the environment.

39. The agent device of claim 32, further comprising one or more sensors configured to measure the current state of the environment.

40. The agent device of claim 39, wherein the one or more sensors comprise a camera.

* * * * *